United States Patent [19]

Löw

[11] Patent Number: 4,469,545
[45] Date of Patent: Sep. 4, 1984

[54] HEATING APPARATUS FOR THERMALLY BONDING PLASTIC FOILS AND METHOD FOR THE OPERATION THEREOF

[75] Inventor: Martin Löw, Löhningen, Switzerland

[73] Assignee: SIG Schweizerische Industrie-Gesellschaft, Neuhausen am Rheinfall, Switzerland

[21] Appl. No.: 531,671

[22] Filed: Sep. 13, 1983

[30] Foreign Application Priority Data

Sep. 16, 1982 [CH] Switzerland .................... 5490/82

[51] Int. Cl.³ .............................................. H05B 1/02
[52] U.S. Cl. .................................. 156/359; 156/583.1; 156/583.4; 219/243; 219/487; 219/508
[58] Field of Search .................. 156/359, 583.1, 583.4; 219/243, 476, 480, 483, 486–487, 497, 508

[56] References Cited

U.S. PATENT DOCUMENTS

| | | | |
|---|---|---|---|
| 3,148,269 | 9/1964 | Hartesveldt et al. | 219/483 X |
| 4,127,854 | 11/1978 | Gardner | 219/487 X |
| 4,160,689 | 7/1979 | Altermatt | 156/583.1 |
| 4,321,457 | 3/1982 | Edel et al. | 219/483 X |

Primary Examiner—David A. Simmons
Attorney, Agent, or Firm—Spencer & Frank

[57] ABSTRACT

Heating apparatus for thermally bonding thermoplastic foil layers to produce a longitudinally welded seam. The heating apparatus comprises an elongated jaw element having a work surface for receiving the thermoplastic foils, at least two heating elements located within the jaw element and at least one temperature sensor associated with each of the heating elements. A control device is coupled to each of the heating elements and its respective temperature sensor to maintain the temperature of the jaw element at a value which will result in bonding of the foil layers. A regulating device is coupled to the control devices and to the temperature sensors for selectively operating the control devices to switch the heating elements in accordance with the temperature detected by the temperature sensor.

8 Claims, 5 Drawing Figures

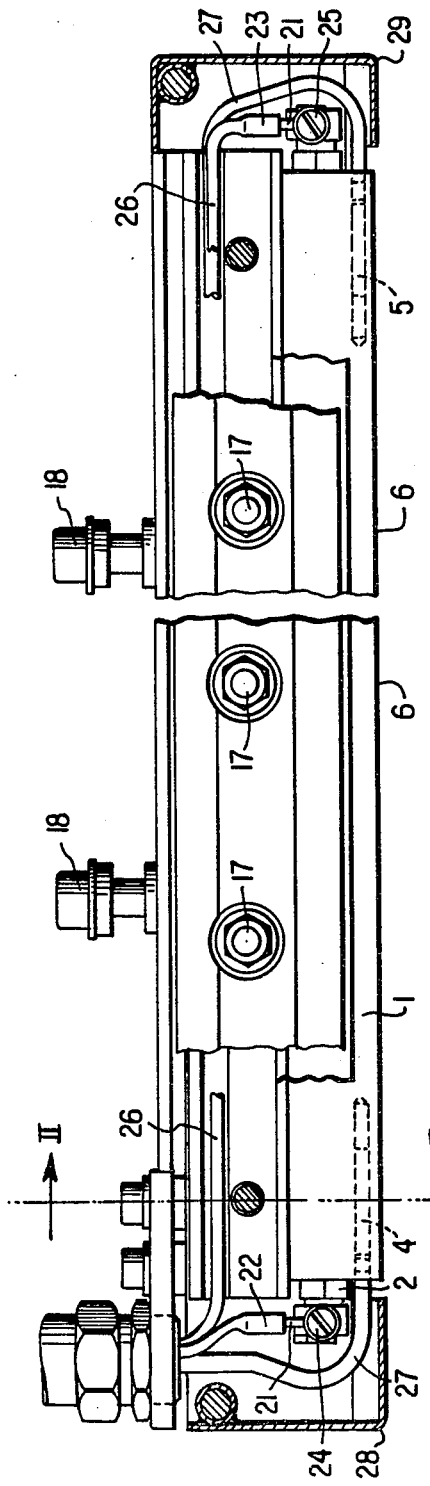

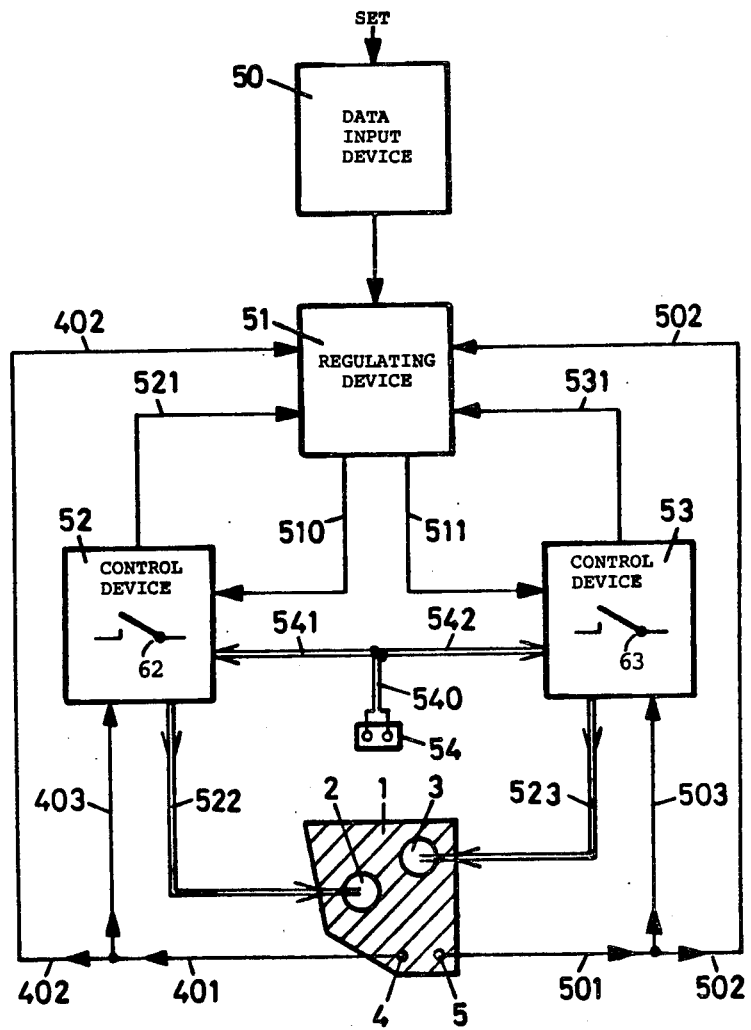

HEATING APPARATUS FOR THERMALLY BONDING PLASTIC FOILS AND METHOD FOR THE OPERATION THEREOF

BACKGROUND OF THE INVENTION

The present invention relates to a heating apparatus for thermally bonding plastic foils and to a method for operating this apparatus.

In the packaging industry it is known to form band-shaped thermoplastic packaging material into the shape of a cylinder, and to then thermally bond the longitudinal edges of the material to produce a welded seam. The thermal bonding is carried out by placing foils of thermoplastic material to be bonded between a pair of sealing jaws, heating the material to its melting temperature and then pressing the edges of the material together.

An apparatus for heating and processing a sealing jaw against a countersupport is disclosed in U.S. Pat. No. 4,160,689 granted to Willy Altermatt on July 10th, 1979. It is known that such devices operate well if the sealing jaws are relatively short, and it has been proposed to subdivide the sealing jaws into several sections which are aligned with one another and resiliently mounted with respect to a support. However, it has been found that, due to the constant heat and the flow of electric current, the electrical terminals leading to the heating elements tend to oxidize thereby increasing their transfer resistance. This causes a reduction in the heat output of the heating element, and sooner or later the quality of the welded seams suffers. Until this is noted, however, and such flaws can be eliminated, portions of the seams may be welded insufficiently, a risk that is not acceptable with gastight packages.

It is therefore an object of the present invention to provide an apparatus and method for heating the sealing jaws to the required temperature over long periods of time and to maintain operational reliability over longer periods of time despite increasing oxidation of the terminals.

SUMMARY OF THE INVENTION

This is accomplished by the present invention wherein heating apparatus is provided for thermally bonding thermoplastic foil layers to produce a longitudinally welded seam. The heating apparatus comprises an elongated jaw element having a work surface for receiving the thermoplastic foils, at least two heating elements located within the jaw element and at least one temperature sensor associated with each of the heating elements. A control device is coupled to each of the heating elements and its respective temperature sensor to maintain the temperature of the jaw element at a value which will result in bonding of the foil layers. A regulating device is coupled to the control devices and to the temperature sensors for selectively operating the control devices to switch the heating elements in accordance with the temperature detected by the temperature sensors.

BRIEF DESCRIPTION OF THE DRAWINGS

FIG. 1 is an elevational view, partially in section, of a sealing jaw.

FIG. 2 is a sectional view of the sealing jaw to an enlarged scale, taken along section line II—II of FIG. 1.

FIGS. 3 and 4 are simplified sectional views, similar to that of FIG. 2, which illustrate the heat flow lines within the sealing jaw.

FIG. 5 is a block diagram showing the control apparatus of the invention.

DESCRIPTION OF THE PREFERRED EMBODIMENTS

The sealing jaw shown in FIGS. 1 and 2 includes a jaw element 1 in which are embedded two electrical heating rods 2 and 3 and two laterally disposed temperature sensors 4 and 5. The jaw element 1, which is made of a material having good heat conducting properties, preferably copper, is held by means of two clamping jaws 11 and 12 with strips 13, 14 and 15 of insulating material therebetween. The two clamping jaws 11 and 12 are pressed together by means of bolts 16 having nuts 17 attached thereto. Bolts 18 are used to fasten the jaw element 1 to a carrier 19, carrier 19 and heating rod 3 being shown in FIG. 2 but not in FIG. 1.

Two shells 28 and 29 cover the current conducting terminals and connecting members. In the one clamping jaw 12, above the clamping connection including bolts 16 and nuts 17, there is disposed a cable groove 20 which is v accessible from the top when the sealing jaws are installed. One end of heating rod 2 is connected to one terminal of a source (not shown) of electrical power through a cable termination 22 and terminal 21, and the other end is connected to the other terminal of the power source by means of a cable 26, cable termination 23 and terminal 21. The terminals 21 are secured to respective end of the heating rod 2 by means of screw connections 24 and 25. In the same manner, the cable ends are fastened to heating rod 3. As indicated in FIG. 1, cable 26 for feeding the heating rod 2 as well as the electrical lines 27 for the temperature sensor 5 are laid in cable groove 20.

A part of a bag 31 having two edge sections 32 and 33 made from foil layers of thermoplastic synthetic material is shown interposed between a support 30, made of TEFLON, and the jaw element 1. Heat is applied to the bag to bond a longitudinal seam when it is in the position illustrated in FIG. 2.

Heating rods 2 and 3, positioned within the jaw element 1, are shown schematically in FIGS. 3 and 4. In FIG. 3, the + symbol indicates that only heating rod 2 is connected to the power source and, in FIG. 4, this symbol indicates that only heating rod 4 is connected to the power source. The lines emanating perpendicularly from the circles indicating heating rods 2 and 3, which terminate perpendicularly at the edge lines of jaw element 1, represent thermal force lines. Heating rods 2, 3 are positioned within the cross-sectional area of jaw element 1 so that approximately the same quantity of heat reaches the work surface 6 from each of the heating rods.

FIG. 5 is a block diagram of apparatus for operating the heating rods 2 and 3 in jaw element 1. The temperature sensors 4 and 5 are not positioned as shown schematically in FIG. 5 but rather as illustrated in FIG. 1, FIG. 5 being indented to show the electrical connections of the sensors but not their physical orientation. Two control devices 52, 53, each including a switch 62, 63 for switching on and off the current supplied to heating rods 2, 3 respectively, are supplied with power through a plug-in connection 54. Plug-in connection 54 is connected to control device 52 by lines 540 and 541 and to control device 53 by lines 540 and 542. Power is conducted from control devices 52 and 53 to heating rods 2 and 3 via lines 522 and 523, respectively.

Temperature sensors 4 and 5 are connected with control devices 52, 53 via lines 401, 403 and 501, 503, respectively. Although shown as single lines, lines 401, 403, 501 and 503 are actually two-wire lines since temperature dependent resistors are preferably employed as the temperature sensors. Information lines 402 and 502, connected to the junctions of lines 401, 403 and 501, 503, respectively, provide signals to a regulating device 51. The signals applied to the regulating device correspond to the actual temperature of jaw element 1 as determined by sensors 4 and 5.

Input values for operation of the apparatus are set into a data input device 50 by means of pushbuttons, switches or other known means (not shown). These input values could include, for example, the heat required to weld the foils together, the ambient temperature and similar information. The output of input device 50 is coupled to the regulating device 51 which, in turn, is coupled to control devices 52 and 53 by means of lines 510 and 511 respectively. Signals corresponding to the relationship between the desired temperature values on lines 510 and 511 and the actual temperature values on lines 403 and 503 are coupled from the control devices 52 and 53 to regulating device 51 via lines 521 and 531 respectively.

In operation, only one heating rod, for example heating rod 2, is used initially. When jaw element 1 is heated for the first time, the second heating rod 3 may also be used so that the operating temperature can be increased rapidly to a constant value. When the output from temperature sensor 4 on line 403 corresponds to the desired temperature signal on line 510 from regulating device 51, control device 52 interrupts the current to line 522 until a lower temperature limit is reached so that the temperature at the working surface 6 of jaw element 1 fluctuates about the desired value according to a hysteresis loop.

If a disturbance occurs in the apparatus, as for example an increasing transfer resistance in terminal 24 and/or terminal 25 which causes the desired temperature to no longer be reached, an error signal is produced on line 521. This causes the switch in control device 53 to close so that additional heating energy can be generated by the second heating rod 3. In a modified operation, heating rod 2, once it can no longer produce the required heat, is switched off so that the entire heating energy is generated in the heating rod 3.

In this way, high operational dependability is realized. Switching from one heating rod to the other takes place in the shortest possible time without operation of the packaging machine having to be interrupted. The switching does not produce a drop in temperature because the newly added heating rod is already close to operating temperature because of its location in jaw element 1. Also, since the heating rod which is switched in after the first heating rod is no longer able to provide the required heat has not been previously energized, or has been energized for only a short time, its terminals are not oxidized, or are only slightly oxidized, and therefore it can immediately provide the necessary amount of heat.

In the above description, it has been assumed that only one sealing jaw is provided and that is has heating rods of the same length as the sealing jaw. The sealing jaw could also be made in two or more parts, according to the previously mentioned U.S. Pat. No. 4,160,689, or a plurality of sealing jaws could be arranged one behind the other and individually controlled in the same manner. For this purpose, regulating device 51 would be connected with a correspondingly large number of control devices, heating rods and temperature sensors.

It will be understood that the above description of the present invention is susceptible to various modifications, changes and adaptations, and the same are intended to be comprehended within the meaning and range of equivalents of the appended claims.

What is claimed is:

1. Heating apparatus for thermally bonding thermoplastic foil layers to produce a longitudinal welded seam, comprising
    an elongated jaw element having a work surface for receiving said thermoplastic foil layers;
    at least two heating elements located within said jaw element, each of said heating elements being positioned and dimensioned to heat individually a given portion of said work surface to a desired temperature which is sufficient to securely bond said foil layers;
    at least one temperature sensor associated with each of said heating elements and located within said jaw element, each of said temperature sensors generating an electrical signal proportional to the temperature of said work surface;
    a control device for each of said heating elements, each of said control devices being coupled to one of said heating elements and its associated temperature sensor, said control device controlling the current through its associated heating element to maintain a constant temperature at the given portion of said work surface; and
    a regulating device coupled to said temperature sensors and control devices, said regulating device selectively operating said control devices to switch from one of said heating elements to the other in accordance with the temperature detected by said temperature sensors.

2. A heating apparatus as defined in claim 1, wherein said heating elements extend parallel to each other over approximately the entire length of said jaw element.

3. A heating apparatus as defined in claim 2 wherein two heating elements and two temperature sensors are provided, said temperature sensors separately measuring the temperature reached by said jaw elements, and wherein each of said temperature sensors is coupled to an associated one of said control devices, said control devices switching on and off the current in its associated heating element in accordance with the output of the associated temperature sensor.

4. The method of operating the heating apparatus defined by claim 1 which includes the steps of
    energizing all of said heating elements to rapidly heat said jaw element to a desired temperature required to bond said foil layers;
    deenergizing all but one of said heating elements; measuring the temperature of said jaw element; and
    energizing another of said heating elements when the temperature of said jaw element drops below a predetermined temperature which is lower than said desired temperature.

5. The method defined by claim 4 which includes the step of deenergizing said one heating element when said another heating element is energized.

6. Heating apparatus for thermally bonding thermoplastic foil layers to produce a longitudinal welded seam, comprising an elongated jaw element having a work surface for receiving said thermoplastic foil layers;

first and second heating elements located within said jaw element, each of said heating elements being positioned and dimensioned to heat individually a given portion of said work surface to a desired temperature which is sufficient to securely bond said foil layers;

temperature sensing means located within said jaw element, said temperature sensing means generating an electrical signal proportional to the temperature of said work surface;

first and second control devices coupled to said first and second heating elements respectively and to said temperature sensing means, each of said control devices having a switch for electrically energizing and deenergizing the associated heating element in accordance with the signal generated by said temperature sensing means, the temperature of said jaw element being maintained thereby within a predetermined range; and a regulating device coupled to said temperature sensing means and to said first and second control devices, said regulating device controlling said first and second control devices to energize said first heating element to heat said jaw element to said desired temperature, and energize said second heating element if the temperature of said jaw element falls below a predetermined temperature which is less than said desired temperature.

7. A heating apparatus as defined in claim 6 wherein said regulating device energizes said second heating element simultaneously with said first heating element to increase the rate of heating said jaw element to said desired temperature.

8. A heating apparatus as defined in claim 7 wherein said regulating device deenergizes said second heating element after said jaw element reaches said desired temperature.

* * * * *